Patented May 17, 1949

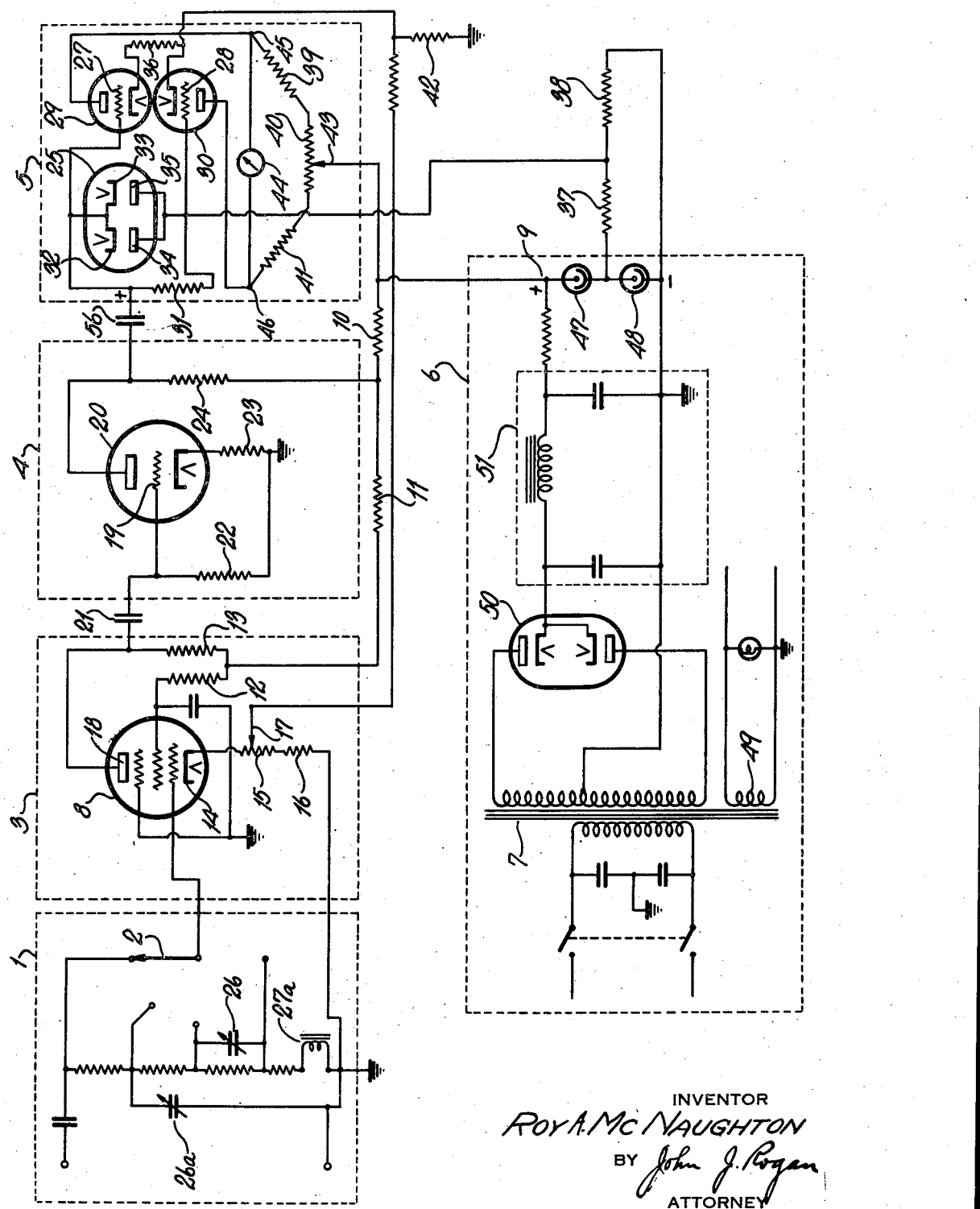

2,470,219

UNITED STATES PATENT OFFICE 2,470,219

LINEAR RESPONSE VACUUM TUBE VOLTMETER

Roy A. McNaughton, Emporium, Pa., assignor to Sylvania Electric Products Inc., Emporium, Pa., a corporation of Massachusetts Application March 7, 1944, Serial No. 525,355

8 Claims. (Cl. 171—95)

This invention relates to electric testing circuits and more particularly to a class of test circuits known as vacuum tube voltmeters.

Vacuum tube voltmeters are extensively used in radio laboratories, electronic industries and research laboratories. They represent an essential piece of test equipment in all cases where it is desired to measure the voltage at certain terminal points under operating conditions, and where it is of great importance that the measuring instrument itself does not present an appreciable load to the voltage source. In other words, a vacuum tube voltmeter is an instrument which can be used for measuring voltage sources of low power capabilities and of high inner impedance, because it consumes an extremely small amount of power, and thus does not substantially change the operating voltage at the terminals to which it is applied.

A vacuum tube voltmeter is substantially a detector, which makes use of rectified D. C. current in the plate output circuit for measuring an A. C. voltage applied to an input circuit. If properly designed, it may be calibrated at low frequencies and used at any desired frequency including ultra-high frequencies, with certain restrictions, e. g., those conditional upon electron transit time in the tubes used, and upon stray impedances. Specifically, vacuum tube voltmeters are of particular advantage for the direct measurement of transformer turns ratios, inductances, capacities and resistances, grid voltages, transconductances and gains of amplifier tubes and the like.

The advantages of ordinary vacuum tube voltmeters are generally attended by a number of inconveniences, such as non-linearity of the relation between input voltage and output rectified current, shift of zero point, requirements for frequent re-adjustment of the zero point during a test run, and complicated compensations for changes in ranges that are desired to be measured, and usually by the necessity of a careful stationary set-up on a laboratory table.

It is, therefore, a principal object of the invention to provide a vacuum tube voltmeter which yields a linear relation between rectified output current and A. C. input voltage over a very wide range of input frequencies e. g., from 30 C. P. S. into the ultra-high audio frequency spectrum.

Another object is to provide a vacuum tube voltmeter of high accuracy, which can be easily calibrated, and wherein the interaction between zero setting and feedback becomes negligible as the meter approaches correct calibration.

Another object is to provide a vacuum tube voltmeter with a specially designed unbalanced bridge circuit in the output of a push-pull amplifier for securing a linear output current response to linear input voltage changes.

A further object is to provide a voltage measuring unit which is not sensitive to power supply voltage changes over a range of ±15% of the standard line voltage.

A further object is to provide a vacuum tube voltmeter having means for frequency compensation in the input attenuator resulting in a flat response of the meter in the range from the lowest to the highest audio frequencies.

A feature of the invention relates to the means including degenerative amplifiers whereby a signal delivered to a half wave rectifier is applied to one grid circuit of a balanced push-pull output stage so as to develop a more positive D. C. bias to the grid of one of the tubes in that circuit.

Another feature relates to the means including a cathode resistor common to both sides of a balanced output push-pull stage, and a tapped resistor across a voltage regulator tube for obtaining a straight line plate current-grid voltage curve of the output tubes.

Another feature relates to the means for feeding back part of the voltage across the common cathode bias resistor of a push-pull output amplifier to the cathode of a previous amplifier stage, for reducing the gain of an input amplifier as the signal level increases.

A further feature relates to the means including a novel combination of adjustment of the output stage operating point and the D. C. feedback circuit in a vacuum tube voltmeter for producing a linear current unbalance across the output stage in response to linear input signal voltages.

A still further feature relates to a vacuum tube voltmeter unit comprising a gas tube regulated power supply rectifier and cathode resistance compensation of the contact potential of the electrodes of a rectifier between the grids of the output tubes.

The invention will now be described in connection with the single figure of the drawing in which device 1 represents a selector attenuator for various input voltage ranges, including a tapped high resistance voltage divider with tunable frequency compensating condensors 26, 26a, and inductance 27a; device 2 is the selector switch for choosing the measuring range; device 3 is a preamplifier; device 4 is a driver stage; and device 5 is a detector indicator. Plate voltages, screen voltages, filament voltages for all tubes of stages 3, 4 and 5, are supplied by power pack 6 which is fed by a convenient A. C. supply through the primary of transformer 7, e. g., 110 volts, 60 cycles.

Preamplifier 3 consists of a pentode tube 8 properly supplied with screen and plate voltages from point 9 of the power pack, in conventional manner, over stage isolating resistors 10 and 11, screen and plate load resistors 12 and 13, the cathode 14 biased by cathode resistors 15 and 16. Cathode resistor 15 also serves as an adjustable feed-back voltage regulator from the output amplifier 5, the amount of negative feedback being controlled by sliding contact 17.

The amplified signal voltage is fed from the plate 18 of the preamplifier tube 8 to the grid 19 of driver tube 20 in conventional manner by coupling-capacity 21 and grid leak resistor 22. Grid and plate voltages of the driver tube 20 are provided by cathode resistor 23, plate load resistor 24, and stage isolating resistor 10, respectively.

The signal amplified by driver tube 20 is fed to double diode 25 through coupling-capacity 56, developing a rectified potential between the grids 27, 28, of the push-pull triodes 29 and 30, and on the diode load resistor 31. The rectifier cathodes 32, 33, are connected to the grid of tube 29, its anodes 34, 35, to the grid of tube 30 so as to produce a positive signal voltage on the grid of tube 29 as compared to that on the grid of tube 30. Resistor 36 between the cathodes of the output tubes is to compensate for the contact potential of the diodes. The effective contact potential of the half-wave rectifier 25 tends to upset the balance of the output system. The rectified potential causes the effective contact potential to decrease the bias on grid 27, and for this purpose resistor 36 is provided between the cathode of tube 29 and the cathode of tube 30, this resistance 36 being in series with the common bias resistor 42. Resistor 36 can be selected of such a value that the plate current of tube 29 develops across resistor 36 a voltage approximately equal to the effective contact potential applied to grid 27 by reason of the half-wave rectifier. These two voltages are opposing in their effect on the grid cathode circuit of tube 29, and the voltage between the grid and cathode of tube 29 is maintained equal to the voltage between the grid and cathode of tube 30, thus keeping the output system balanced.

Resistors 37, 38, 39, 40, 41 and 42, are so chosen that the grids of tubes 29 and 30 are properly biased, and tap 43 is so adjusted as to give zero (or fixed reference potential) reading on milliammeter 44 when feed-back tap 17 has been properly adjusted for full scale reading of milliammeter 44, which is connected between bridge points 45 and 46.

In adjusting the "zero" or "zero reference reading" of milliammeter 44 whose response is linear over about 94% of its full scale as a result of the differential or push-pull arrangement of meter 44 between points 45 and 46, corresponding to the overlapping of two straight sections of the current-voltage characteristics of tubes 29 and 30, the following consideration will be explanatory. Partly because of the contact potential between the diode electrodes, but mainly because of the three-half power law of the diode current-voltage response, there is a small region near zero voltage signal in which the milliammeter reading is not strictly proportional to the signal voltage. If the zero signal reference reading of the milliammeter were chosen exactly equal to zero current, the reading of the milliammeter current over most (about 94%) of the meter scale would still be linear, but not simply proportional to the signal voltage. A constant low value, corresponding to the short initial bend of the space charge current voltage curve of the vacuum rectifier would have to be added to the meter reading. This error has been determined (for the circuit elements shown in the figure) to be of the order of about 4% over the meter scale between one tenth and 1.5 ma. In order to compensate for this constant error, it is proposed to adjust the zero signal meter reading to .06 ma., and to choose the position of attenuator switch 2 in such a way that in operation, meter readings are taken between .1 and 1.5 ma. This can always be accomplished. This "zero signal" correction results in an accuracy of strict proportionality between meter reading and signal voltage of better than 98% over the full meter scale between .1 and 1.5 ma. Measurements for these accuracy figures have actually been made, but there is no doubt that higher accuracy can be obtained if desired. A 2% error is permissible because it is lower than the tolerances usually accepted for tube characteristics and for other measurements for which the linear response multiple range portable vacuum tube voltmeter was primarily designed.

A particularly convenient method of biasing the grids of the output tubes 29, 30, is provided by the splitting of the power pack D. C. voltage by means of two voltage regulator tubes 47 and 48, and the proper choice of resistors 42, 37 and 38 as compared to resistors 39, 40 and 41. Another convenient arrangement is the method of feeding back part of the voltage developed between the cathodes of tubes 29 and 30 and ground, to a selectable point of cathode resistor 15 of preamplifier tube 8.

The other details of the power pack, such as filament windings 49, rectifier 50 and filter 51 are of conventional design. If desired, the plate, screen and output tube bias supply voltage may be replaced by any available voltage sources. From a practical viewpoint it is, however, usually a great advantage to have a complete portable vacuum tube voltmeter unit with self contained power pack, which can be plugged into a conventional outlet of A. C. supply. Thus a unit as originally built for experimental use is contained substantially in a cubical cabinet of 8" side length, whose dimensions can be reduced to even smaller size by an inclined panel replacing part of one of the cube faces. The panel carries the milliammeter, range switch, a jack and adjuster for zero reference reading of the milliammeter.

What I claim is:
1. A vacuum-tube voltmeter comprising input terminals to receive alternating current voltages to be measured, output measuring terminals, an indicating meter connected to said output terminals; and in sequence between the said input terminals and the output terminals an alternating preamplifier, a half-wave rectifier, a pair of grid-controlled amplifier tubes each having a cathode, a control grid and an anode, said tubes having their respective grids connected in unbalanced relation to said rectifier, a rectifier load resistor connected between the grids of said tubes, a resistance bridge connected across the anodes of said amplifier tubes, a source of D. C. anode supply volt- age adjustably connected to said bridge, said indicator device being connected across said anodes, a first resistor connected between the cathodes of said amplifier tubes, a second resistor connected in series with said first resistor and ground, said first resistor being proportioned with respect to the second resistor to compensate for the contact potentials applied to the grid of first amplifier tube through said rectifier tube, and D. C. negative feedback means connecting said second resistor to said preamplifier to maintain a linear relationship between the signal indications on said indicator and the voltages of the signals applied to said input terminals.

2. A vacuum-tube voltmeter having a half-wave rectifier for alternating current voltages to be measured, a pair of grid-controlled amplifier tubes each having a cathode, a control grid and an anode, a load resistance for said rectifier, said resistance being connected between the grids of said amplifier tubes, a source of fixed potential connected to said rectifier and said load resistor whereby the grid of one of said tubes is fixedly biased, means to compensate for the non-linear voltage-current characteristic of said rectifier and amplifier combination to produce a measuring indication which bears a linear relationship to the signal voltages to be measured, the last-mentioned means including cathode bias resistors for said amplifier tubes, one of which bias resistors is common to both cathodes and one of which is connected to bias said cathodes differently, and an output utilization circuit connected to the anodes of said amplifier tubes.

3. A vacuum-tube voltmeter comprising a push-pull output amplifier having a pair of grid-controlled electron tubes each having a cathode, a control grid and an anode, an output indicator connected to said amplifier a diode rectifier having a load resistor for impressing a positive rectified voltage on the grid of one of said push-pull tubes with respect to the voltage applied to the grid of the other of said push-pull tubes, a cathode bias resistor for the first of said push-pull tubes, a cathode bias resistor common to both of said push-pull tubes, said bias resistors being connected in series between the cathode of said first tube and ground, a preamplifier for the voltages to be measured, said preamplifier having a cathode resistor with a tapping point connected to said second-mentioned cathode bias resistor for feeding-back part of the voltage drop across said second bias resistor to the cathode of said preamplifier and thereby maintaining the output indications of the voltmeter in linear relationship with the input voltages to be measured.

4. In a measuring system of the character described, input terminals, means for rectifying voltages received at said input terminals for measurement, said rectifying means being a type that yields an output potential in the absence of voltage across said input terminals, a pair of grid-controlled tubes, each tube including a grid, a cathode, and an anode, said tubes having their anodes connected in adjustable balancing relation to a calibrated direct current indicator and having their grids connected in unbalanced relation to said rectifying means, and a biasing resistor joined to the cathode of that tube that would otherwise pass the higher current upon application of said output potential, said resistor being of such size as to restore current balance when no voltage is applied to said input terminals.

5. A vacuum tube voltmeter comprising a diode rectifier, a pair of grid-controlled tubes including grids, cathodes, and anodes, and having an output indicator connected between the anodes thereof and balancing anode load resistors, a common resistor for the cathodes of said tubes, said diode rectifier being connected so as to apply voltage to the grid of one of said tubes, said diode being of a type that inherently produces contact potential, the grid of the other of said tubes being connected to a point of stable potential, and an unbalancing resistor between one of said cathodes and said common cathode resistor of such size as to provide a bias increment on one of said tubes equal and opposite to the unbalancing effect of the contact potential of said rectifier when no signal is impressed on said rectifier.

6. A vacuum tube voltmeter comprising a diode rectifier, a first and a second grid-controlled tube including control grids, anodes, and cathodes and having an output indicator connected between the anodes thereof and balancing anode load resistors, a common resistor for the cathodes of said tubes, said diode rectifier being connected to the grid of the first of said tubes to apply positive voltage thereto upon application of an alternating voltage to said rectifier, the grid of the second tube being connected to a point of stable potential, and an additional resistor between the cathode of the first tube and said common resistor of such size as to overcome the unbalancing effect of the contact potential of said rectifier when no alternating voltage is impressed on said rectifier.

7. In a measuring system of the character described, input terminals, a half-wave rectifier for rectifying voltages received at said input terminals for measurement, a pair of grid-controlled tubes having their outputs connected in adjustable balancing relation to a calibrated direct current indicator and having their inputs connected in unbalanced relation to said rectifier so as to apply positive output voltage to only one grid, and means for rendering the output current to be measured linear with respect to the input voltage at said terminals over substantially the entire range of input voltages notwithstanding the non-linear characteristic of said half-wave rectifier, said last named means including an alternating current preamplifier ahead of said half-wave rectifier, a cathode bias resistor for said tubes, and a direct current negative feedback circuit from said bias resistor to said preamplifier.

8. A vacuum tube voltmeter comprising a push-pull output amplifier having a pair of grid-controlled electron tubes each having a cathode, a control grid, and an anode, a load resistance between said anodes, a direct reading direct current meter in shunt with said load resistance, means for adjusting a low-reference reading on the direct current meter for zero signal, comprising an adjustable contact at the load resistor feeding desired direct current voltages to said anodes, a diode rectifier having a load resistor for impressing a positive rectified voltage on the grid of one of said tubes with respect to the voltage applied to the grid of the other of said tubes, a cathode bias resistor for the first of said push-pull tubes, a cathode bias resistor for both of said tubes, said bias resistors being connected in series between the cathode of said first tube and ground, a preamplifier for the voltages to be measured, said amplifier having a cathode resistor with a tapping point connected to the said second-mentioned cathode bias resistor for feeding back part of the voltage drop across said second bias resistor to the cathode of said preamplifier and thereby maintaining the output indications of the voltmeter in linear relationship with the input voltages to be measured.

ROY A. McNAUGHTON.

REFERENCES CITED

The following references are of record in the file of this patent:

UNITED STATES PATENTS

| Number | Name | Date |
|---|---|---|
| 2,081,074 | Strauss | May 18, 1937 |
| 2,147,729 | Wurmser | Feb. 21, 1939 |
| 2,190,743 | Vance | Feb. 20, 1940 |
| 2,211,010 | Hallmark | Aug. 13, 1940 |
| 2,224,699 | Rust | Dec. 10, 1940 |
| 2,255,679 | Riddle, Jr. | Sept. 9, 1941 |
| 2,300,198 | Brown | Oct. 27, 1942 |
| 2,315,312 | Brown | Mar. 30, 1943 |
| 2,316,044 | Blair | Apr. 6, 1943 |
| 2,324,215 | Kinsburg | July 13, 1943 |
| 2,368,351 | Ewen | Jan. 30, 1945 |

OTHER REFERENCES

Vacuum Tube Voltmeters, by John F. Rider; John F. Rider Publisher, Inc. Copyright 1941; Fig. 5–5, p. 76; Fig. 8–6, p. 119; Fig. 7–9, p. 104 and p. 103.